US000001069H

United States Statutory Invention Registration [19]

[11] Reg. Number: H1069

Fahrner

[43] Published: Jul. 7, 1992

[54] SELF SEALING SEAL

[75] Inventor: Richard L. Fahrner, Huntington Beach, Calif.

[73] Assignee: The United States of America as represented by the Secretary of the Army, Washington, D.C.

[21] Appl. No.: 775,312

[22] Filed: Oct. 7, 1991

[51] Int. Cl.[5] ..... F16J 15/46

[52] U.S. Cl. ..... 277/34

*Primary Examiner*—Michael J. Carone

*Attorney, Agent, or Firm*—Fred M. Bush; Hugh P. Nicholson

[57] ABSTRACT

A spring tension retained, gas pressure actuated annular piston is mounted on a centered gas tube disposed within an outer gas tube connected to a gas flow tube. The annular piston which is positioned around the centered gas tube and within the outer gas tube is connected to a retractable tension spring positioned on the outer surface of the center tube. In the absence of gas pressure, the force of the tension spring retracts the annular piston away from the mating surface of the structure to which it is mated or to be mated, but subsequently, after gas pressure is applied to the annular piston the force of tension spring is overcome, and mating of surfaces of piston-seal and the structure to be mated takes place to achieve a firm seal without damaging the interface seal disposed between piston and mating surface. The self-sealing seal is employed to connect two sections of a gas supply tube during missile assembly procedure. If disassembly of missile sections or other structure is required, gas pressure is removed and the tension spring retracts the piston-seal from the mating surface. The surface area of the annular piston is sized to achieve a force for sealing proportional to the gas pressure.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SELF SEALING SEAL

DEDICATORY CLAUSE

The Invention described herein was made in the course of or under a contract or subcontract thereunder with the Government; therefore, the invention described herein may be manufactured, used and licensed by or for the government for governmental purposes without the payment to me of any royalties thereon.

BACKGROUND OF THE INVENTION

Assembling missile stages after manufacture requires that packaging of components must be considered in the completed and mated sections of the missile. For example, the HEDI missile (terminal stage) uses a breechlock joint to assemble the aft missile section to the forward missile section. The breechlock requires two missile sections to be rotated approximately 25 degrees in angle to mate the sections. A high pressure gas supply line or tube goes across the missile joint from the aft end to the forward end of the missile. Because of the breechlock joint rotation, the gas tube had to be located on the missile centerline, resulting in other component packaging restrictions, a difficult assembly process and extra weight to support the tube.

Advantageous would be a design structure which employs a self-sealing seal to enable relocation of the gas line away from the centerline of the missile.

A primary objective of this invention is to provide a self-sealing seal for the gas line or tube positioned at the outer structure of missile sections which require mating and sealing of the gas line which goes across the missile joint from the aft end to the forward end of the missile.

SUMMARY OF THE INVENTION

The self-sealing gas pressure seal as disclosed hereinbelow allows the gas line or tube normally installed down the centerline of the missile to be moved to the outer wall or structure of the missile thereby eliminating missile component packaging constraints and simplifying the assembly of the missile sections.

The self-sealing gas pressure seal employs an annular piston positioned around a centered gas tube. The annular piston is retracted away from the mating surface by a tension spring, but subsequently, after gas pressure is applied to the piston to overcome tension of spring, a piston-seal with the mating surface is allowed to take place. Thus, at the time of mating the aft end and the forward end of the missile and the gas line or tube located in each end thereof, and subsequently, when gas pressure is applied, the gas pressure acting on the piston surface overcomes the spring force causing movement of the piston toward the mating surface and results in establishing a piston-seal relationship with the mating surface without damaging the interface seal. Also, if disassembly is required, gas pressure is removed and the tension spring retracts the piston-seal from the mating surface. The surface area of the piston is sized to achieve a force for sealing proportional to the gas pressure. The gas pressure line and mating surfaces can be sized to allow for manufacturing tolerance.

DESCRIPTION OF THE PREFERRED EMBODIMENT

The self-sealing gas pressure seal of the invention employs an annular piston around the center gas tube which is retracted away from the mating surface by tension spring allowing mating to occur after gas pressure is applied to piston without damaging the interface seal.

Figure 1:
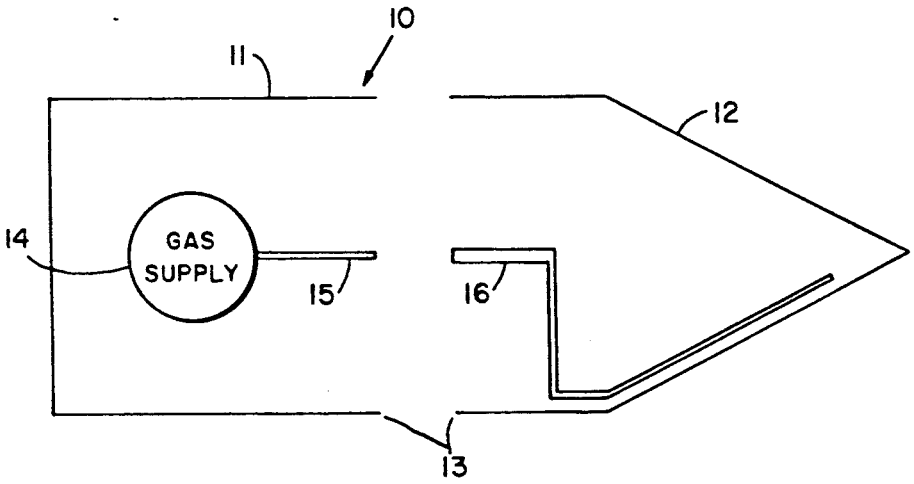
FIG. 1 PRIOR ART
FIG. 1 depicts an aft missile section with a centerline gas supply tube aligned for mating with a forward missile section gas supply tube continuation in accordance with prior art procedure and structure.

In further reference to the Figures of the Drawing, FIG. 1 depicts a missile/gas tube interface 10 for a prior art procedure. The aft missile section 11 is separated from the forward missile section 12 by breechlock joint (not shown) at missile mating plane 13. The procedure and structures require missile rotation of about 25 degrees to mate the sections of missile thereby resulting in requirement for gas tube location on missile centerline. Shown is a gas supply 14 for aft section gas supply tube 15 and forward section gas supply tube 16.

Figure 2:
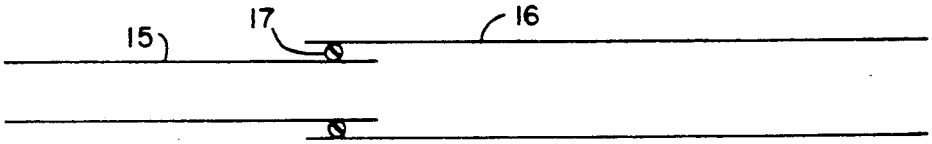
FIG. 2 PRIOR ART
FIG. 2 depicts an enlarged diagrammatic sketch depicting details of gas tube interface of FIG. 1 employing O-ring seal for the joined aft gas tube and forward gas tube also in accordance with prior procedure and structure.

FIG. 2 depicts a portion of prior art procedure for mating missile sections as depicted in FIG. 1 but enlarged to show the detail of the gas tube interface wherein aft gas tube 15 is joined to forward gas tube 16 employing an O-ring seal 17.

Figure 3:
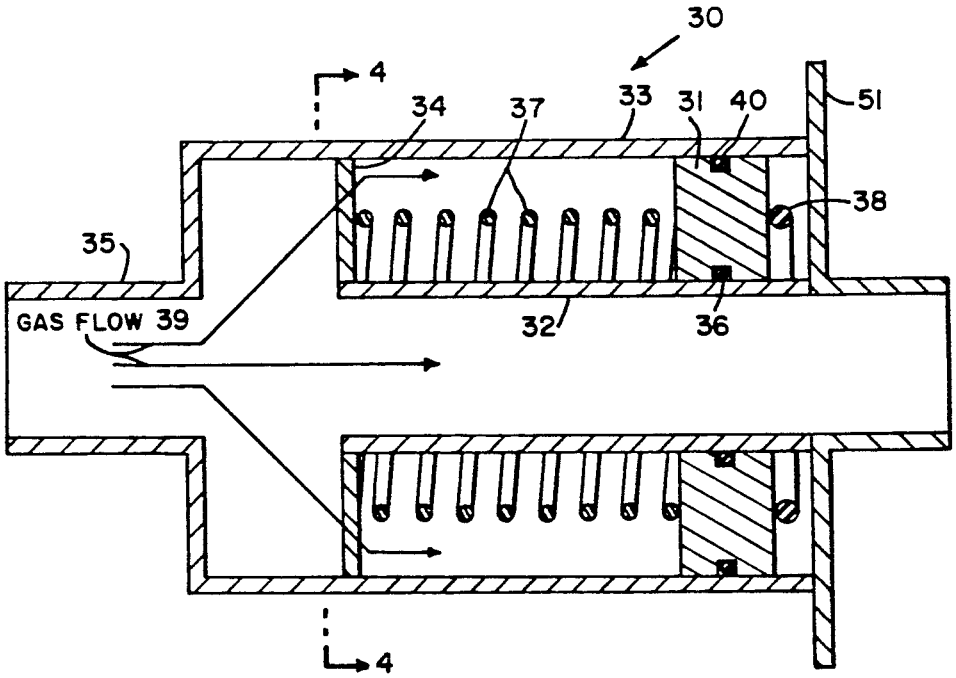
FIG. 3 depicts the self-sealing gas pressure seal of the invention prior to gas pressure being applied to piston/-seal.

FIG. 3 depicts the self-sealing gas pressure seal 30 wherein an annular piston 31 is installed around a center tube 32 and within an outer tube 33. Center tube supports 34 (at four places typically) are employed at an opposite end of center tube to annular piston 31. Mating missile section 51 is shown to illustrate the piston 31 having O-ring 36 positioned between the piston and the center tube 32 and having O-ring 40 positioned between piston and outer tube 33. Tension spring 37 is shown positioned on the outer surface of the center tube (between the center tube and outer tube) which illustrates piston 31 in FIG. 3 in a retracted position (in absence of gas pressure) from mating surface 51 due to spring tension of tension spring 37. O-ring 38 positioned in end of piston 31 provides seal with mating surface 51 when piston is pressurized by gas flow 39 from a gas flow tube 35 from gas supply (not shown).

Figure 4:
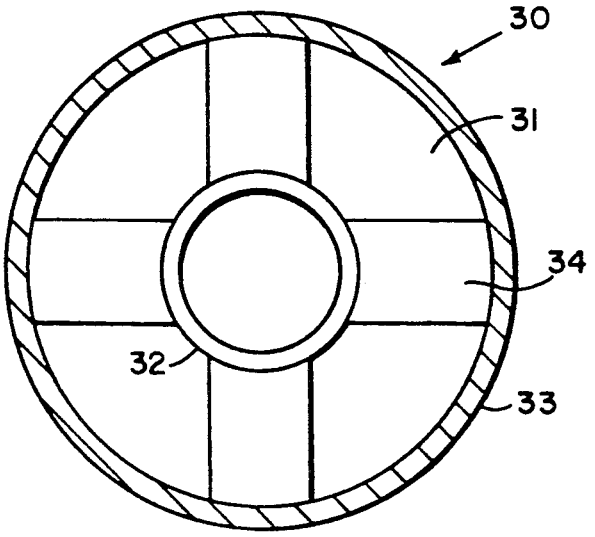
FIG. 4 depicts a view along line 4—4 of FIG. 3 for a self-sealing gas pressure seal wherein tension spring and O-rings are not shown for better clarity.

FIG. 4 is a sectional view taken along line 4—4 of FIG. 3 (with like numerals for like elements) to illustrate location of center tube supports 34 with tension spring and O-rings not shown for further clarity of illustrated parts.

Figure 5:
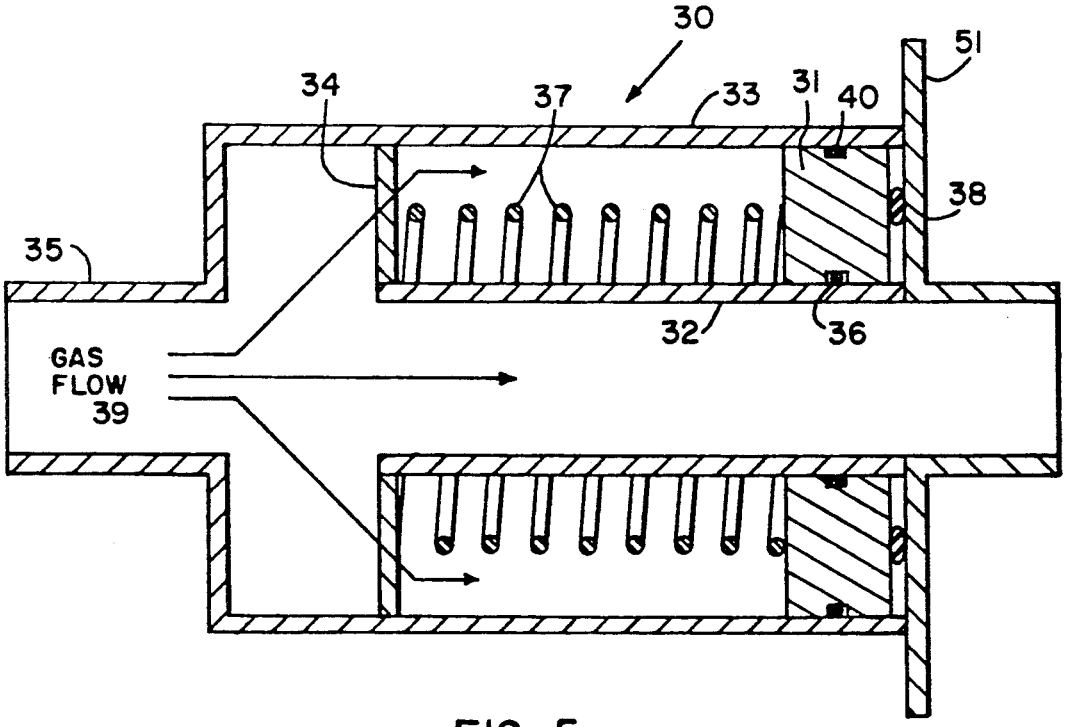
FIG. 5 depicts the self-sealing gas pressure seal after the gas pressure acting on the piston surface overcomes the spring force causing the piston/seal to firmly mate against the mating surface.

FIG. 5 depicts the self-sealing gas pressure seal 30 in an installed condition with associated parts as illustrated in FIGS. 3 and 4 and using like numerals for like elements in these Figures. The installed condition refers to condition when gas pressure is applied, and the gas pressure acting on the piston surface overcomes the spring tension force causing the piston-seal to firmly mate against the mating surface.

If disassembly is required, gas pressure is removed and the tension spring retracts the piston-seal from the mating surface.

The surface area of the annular piston is sized to achieve a force for sealing proportional to the gas pressure. The gas pressure line and mating surfaces can be sized to allow for manufacturing tolerance.

The self-sealing gas pressure seal can be used in the HEDI terminal stage for the high pressure gas line and the air conditioning duct. The device can be used for any gas pressure line required to extend past a rotatable joint.

I claim:

1. A self-sealing gas pressure seal for achieving a piston-seal relationship with a mating surface of a joined structure, said self-sealing gas pressure seal comprising:

(i) a gas flow tube for supplying gas pressure to an outer tube adapted for receiving a supported center tube having an annular piston mounted thereon in a sealed relationship with said outer tube, said annular piston being retracted away from a mating surface by a connected tension spring in the absence of gas pressure acting upon said annular piston and said annular piston after being subjected to sufficient gas pressure to overcome the force of said connected tension spring moves toward a mating surface of a joined structure to achieve a piston-seal with said mating surface without damaging an interface seal;

(ii) an outer tube connected to said gas flow tube, said outer tube having an opposite end that is an open end;

(iii) a center tube centered within said outer tube and having one end aligned with said open end of said outer tube;

(iv) a plurality of center tube support members equally spaced at one end of said center tube, said support members positioned on the outer surface of said center tube and on the inner surface of said outer tube to provide support for the end of said center tube opposite of said open end of said outer tube;

(v) a tension spring positioned on the outer surface of said center tube, said tension spring adapted for connecting to said annular piston to provide a force to retract said annular piston in the absence of gas pressure away from said mating surface of a structure to be joined;

(vi) an annular piston mounted on said center tube at said open end of said outer tube and positioned in contact with the inner surface of said outer tube, said annular piston adapted for connecting and connected to said tension spring which retracts said piston during absence of gas pressure on said piston;

(vii) sealing means disposed between said annular piston and the inner surface of said outer tube and between said annular piston and the outer surface of said center tube to retain a gas pressure relationship within said outer gas tube to permit movement of said annular piston toward said mating surface of a structure to be joined when subjected to gas pressure and said annular piston being retractable by said connected tension spring during absence of gas pressure acting upon said annular piston; and, (viii) an interface seal positioned on the outer surface end of said annular piston of said self-sealing seal for achieving a piston-seal relationship with a mating surface of a joined structure.

2. The self-sealing gas pressure seal for achieving a piston-seal relationship with a mating surface of a joined structure as defined in claim 1 wherein said sealing means are O-rings.

3. The self-sealing gas pressure seal for achieving a piston-seal relationship with a mating surface of a joined structure as defined in claim 1 wherein said annular piston surface area is sized to achieve a force for sealing which is proportional to the gas pressure supplied through said gas flow tube.

* * * * *